United States Patent
Abe

(10) Patent No.: US 11,196,290 B2
(45) Date of Patent: Dec. 7, 2021

(54) UNINTERRUPTIBLE POWER SUPPLY APPARATUS

(71) Applicant: TOSHIBA MITSUBISHI-ELECTRIC INDUSTRIAL SYSTEMS CORPORATION, Chuo-ku (JP)

(72) Inventor: Shoichi Abe, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 0 days.

(21) Appl. No.: 17/051,026

(22) PCT Filed: Nov. 22, 2018

(86) PCT No.: PCT/JP2018/043195
§ 371 (c)(1),
(2) Date: Oct. 27, 2020

(87) PCT Pub. No.: WO2020/105172
PCT Pub. Date: May 28, 2020

(65) Prior Publication Data
US 2021/0126485 A1    Apr. 29, 2021

(51) Int. Cl.
*H02J 9/06* (2006.01)

(52) U.S. Cl.
CPC .............. *H02J 9/061* (2013.01); *H02J 9/062* (2013.01)

(58) Field of Classification Search
CPC .................................. H02J 9/061; H02J 9/062
USPC ...................................................... 307/64, 66
See application file for complete search history.

(56) References Cited

U.S. PATENT DOCUMENTS

| 7,456,520 | B2 | 11/2008 | Colombi et al. |
| 2018/0191194 | A1 | 7/2018 | Nakano |
| 2018/0212460 | A1 | 7/2018 | Shibata |

FOREIGN PATENT DOCUMENTS

WO    WO 2017/017719 A1    2/2017

OTHER PUBLICATIONS

Wu et al., Circulating Current Reduction for a D-Sigma Digital Controlled Transformerless UPS, IEEE, Appllied Power Electronics Conference and Exposition, 2016 (Year: 2016).*
Lu et al., DC-Link Protection and Control in Modular Uniterruptible Power Supply, IEEE, Transactions on Industrial Electronics, vol. 65, No. 5, May 2018 (Year: 2018).*
Office Action dated Aug. 2, 2021 in counterpart Indian Application No. 202017047843.

* cited by examiner

*Primary Examiner* — Michael R. Fin
(74) *Attorney, Agent, or Firm* — Oblon, McClelland, Maier & Neustadt, L.L.P.

(57) ABSTRACT

In an uninterruptible power supply apparatus, a converter (1) is controlled such that terminal-to-terminal voltage (VDC) of a capacitor (Cd) becomes a first reference voltage (VDCr1) in an inverter power feed mode and a bypass power feed mode. In a switching period in which the inverter power feed mode and the bypass power feed mode are switched, the converter is controlled such that the terminal-to-terminal voltage of the capacitor becomes a second reference voltage (VDCr2) higher than the first reference voltage to prevent circulating current (IC) from flowing through a path including the capacitor.

6 Claims, 10 Drawing Sheets

FIG.5
(A)
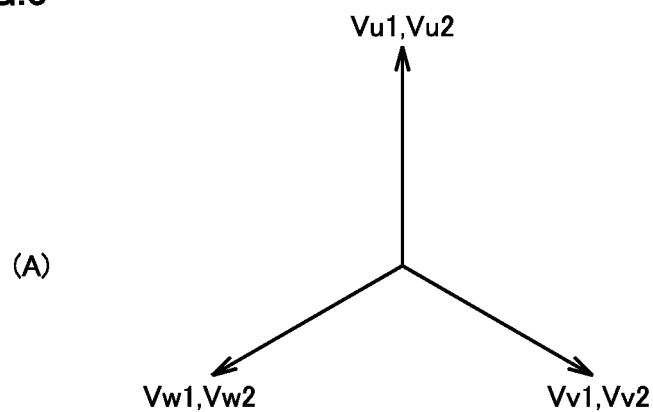
(B)
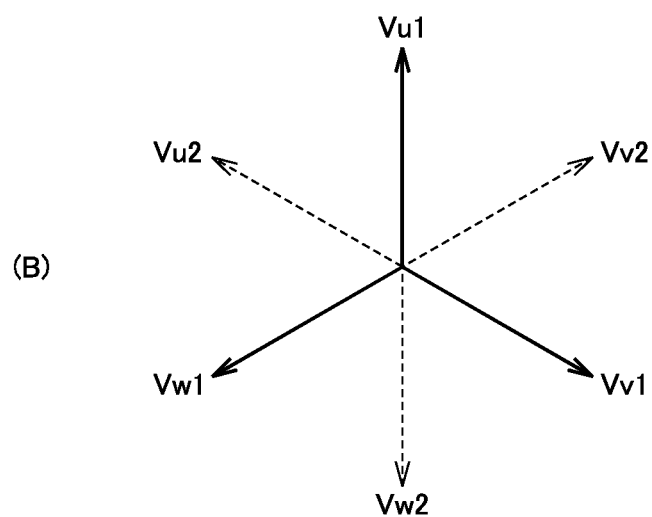
(C)
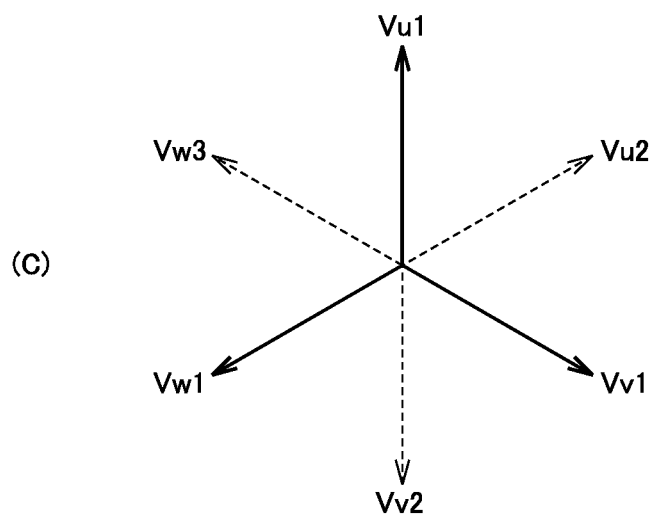

UNINTERRUPTIBLE POWER SUPPLY APPARATUS

TECHNICAL FIELD

The present invention relates to an uninterruptible power supply apparatus, and more particularly to an uninterruptible power supply apparatus having an inverter power feed mode in which AC power is supplied from an inverter to a load, a bypass power feed mode in which AC power is supplied from a bypass AC power supply to the load, and a lap power feed mode in which AC power is supplied from both of the inverter and the bypass AC power supply to the load.

BACKGROUND ART

For example, WO2017/017719 (PTL 1) discloses an uninterruptible power supply apparatus having an inverter power feed mode, a bypass power feed mode, and a lap power feed mode. This uninterruptible power supply apparatus includes a converter configured to convert AC voltage supplied from a commercial AC power supply to DC voltage, a capacitor configured to smooth DC output voltage from the converter, an inverter configured to convert terminal-to-terminal voltage of the capacitor to AC voltage, a first switch having one terminal receiving AC output voltage of the inverter and the other terminal connected to a load, and a second switch having one terminal receiving AC voltage supplied from a bypass AC power supply and the other terminal connected to the load.

In the inverter power feed mode, the first switch is turned on and the second switch is turned off. In the bypass power feed mode, the second switch is turned on and the first switch is turned off. In the lap power feed mode, both the first and second switches are turned on. The lap power feed mode is executed in a switching period of switching between the inverter power feed mode and the bypass power feed mode.

CITATION LIST

Patent Literature

PTL 1: WO2017/017719

SUMMARY OF INVENTION

Technical Problem

Unfortunately, in the conventional uninterruptible power supply apparatus, the commercial AC power supply and the bypass AC power supply each include a three phase AC power supply star-connected to a neutral point, and when both of the neutral points of the commercial AC power supply and the bypass AC power supply are grounded, circulating current may flow from one AC power supply of the commercial AC power supply and the bypass AC power supply to the other AC power supply through the capacitor in the lap power feed mode (see FIG. 6, FIG. 7). If a large circulating current flows, overcurrent is detected, or overvoltage of the capacitor is detected, so that the operation of the uninterruptible power supply apparatus is stopped, and the operation of the load is stopped.

A main object of the present invention is therefore to provide an uninterruptible power supply apparatus capable of preventing circulating current from flowing even when the neutral points of the first and second AC power supplies are grounded.

Solution to Problem

An uninterruptible power supply apparatus according to the present invention includes a forward converter, a capacitor, a reverse converter, a first switch, a second switch, a first control unit, and a second control unit. The forward converter converts three phase AC voltage supplied from a first AC power supply to DC voltage. The capacitor smooths DC output voltage of the forward converter. The reverse converter converts terminal-to-terminal voltage of the capacitor to three phase AC voltage. The first switch is disposed corresponding to each phase of three phase AC voltage output from the reverse converter and has one terminal receiving AC voltage of a corresponding phase and the other terminal connected to a load. The second switch is disposed corresponding to each phase of three phase AC voltage supplied from a second AC power supply and has one terminal receiving AC voltage of a corresponding phase and the other terminal connected to a load. The first control unit turns on the first switch and turns off the second switch in a first mode in which three phase AC voltage is supplied from the reverse converter to the load. The first control unit turns on the second switch and turns off the first switch in a second mode in which three phase AC voltage is supplied from the second AC power supply to the load. The first control unit turns on both of the first and second switches and executes a third mode in which three phase AC voltage is supplied from both of the reverse converter and the second AC power supply to the load, in a switching period in which one mode of the first and second modes is switched to the other mode. The second control unit controls the forward converter such that terminal-to-terminal voltage of the capacitor becomes a first reference voltage in the first and second modes. The second control unit controls the forward converter such that terminal-to-terminal voltage of the capacitor becomes a second reference voltage higher than the first reference voltage in the switching period. The second control unit prevents circulating current from flowing from one AC power supply of the first and second AC power supplies to the other AC power supply through the capacitor.

Advantageous Effects of Invention

In the uninterruptible power supply apparatus according to the present invention, in the switching period in which the first mode and the second mode are switched, the forward converter is controlled such that the terminal-to-terminal voltage of the capacitor becomes the second reference voltage higher than the first reference voltage to prevent circulating current from flowing through a path including the capacitor. The flowing of circulating current therefore can be prevented even when both of the neutral points of the first and second AC power supplies are grounded.

BRIEF DESCRIPTION OF DRAWINGS

FIG. 5 is a diagram showing the relation between three phase AC voltage of the commercial AC power supply shown in FIG. 3 and three phase AC voltage of the bypass AC power supply.

DESCRIPTION OF EMBODIMENTS

Figure 1:
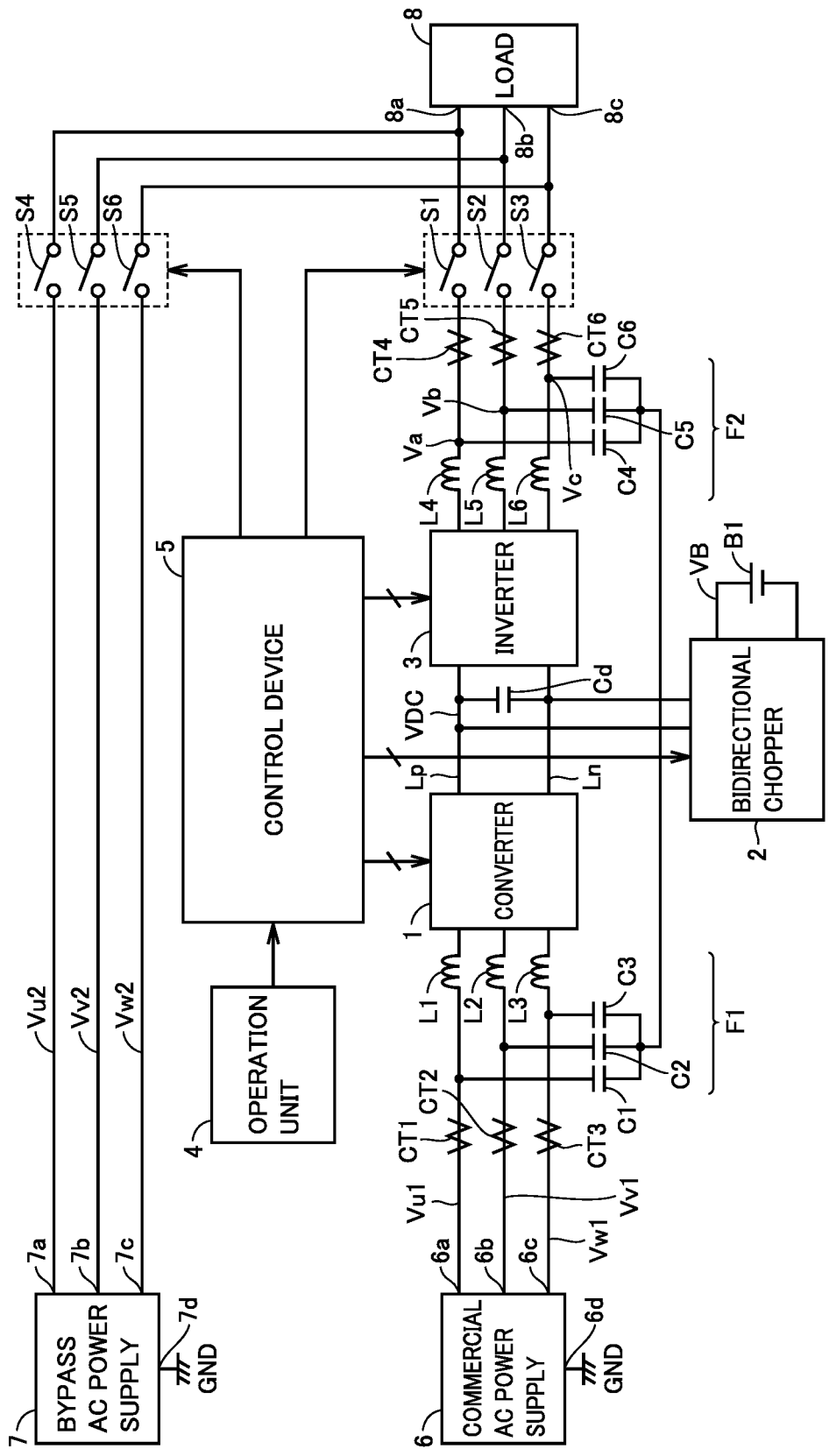
FIG. 1 is a circuit block diagram showing a configuration of an uninterruptible power supply apparatus according to an embodiment of the present invention.

FIG. 1 is a circuit block diagram showing a configuration of an uninterruptible power supply apparatus according to an embodiment of the present invention. In FIG. 1, this uninterruptible power supply apparatus includes capacitors C1 to C6 and Cd, reactors L1 to L6, current detectors CT1 to CT6, a converter 1, a DC positive bus Lp, a DC negative bus Ln, a bidirectional chopper 2, an inverter 3, switches S1 to S6, an operation unit 4, and a control device 5.

This uninterruptible power supply apparatus receives three phase AC power with a commercial frequency from a commercial AC power supply 6 and a bypass AC power supply 7 and supplies three phase AC power with a commercial frequency to a load 8. Commercial AC power supply 6 outputs three phase AC voltages Vu1, Vv1, and Vw1 to AC output terminals 6a to 6c, respectively. A neutral point terminal 6d of commercial AC power supply 6 receives ground voltage GND.

Instantaneous values of three phase AC voltages Vu1, Vv1, and Vw1 are detected by control device 5. Control device 5 detects whether a power failure of commercial AC power supply 6 has occurred, based on AC output voltages Vu1, Vv1, and Vw1 of commercial AC power supply 6.

Bypass AC power supply 7 outputs three phase AC voltages Vu2, Vv2, and Vw2 to AC output terminals 7a to 7c, respectively. A neutral point terminal 7d of bypass AC power supply 7 receives ground voltage GND. Instantaneous values of three phase AC voltages Vu2, Vv2, and Vw2 are detected by control device 5. AC input terminals 8a to 8c of load 8 receive three phase AC voltage from the uninterruptible power supply apparatus. Load 8 is driven by three phase AC power supplied from the uninterruptible power supply apparatus.

Capacitors C1 to C3 each have one electrode connected to the corresponding one of AC output terminals 6a to 6c of commercial AC power supply 6 and have the other electrodes connected to each other. Reactors L1 to L3 each have one terminal connected to the corresponding one of AC output terminals 6a to 6c of commercial AC power supply 6 and have the other terminals connected to three input nodes of converter 1.

Capacitors C1 to C3 and reactors L1 to L3 constitute an AC filter F1. AC filter F1 is a low pass filter, allows AC current with a commercial frequency to flow from commercial AC power supply 6 to converter 1, and prevents a signal with a switching frequency from flowing from converter 1 to commercial AC power supply 6. Current detectors CT1 to CT3 detect AC currents I1 to I3 flowing through reactors L1 to L3, respectively, and apply a signal indicating a detected value to control device 5.

The positive-side output node of converter 1 is connected to the positive-side input node of inverter 3 through DC positive bus Lp. The negative-side output node of converter 1 is connected to the negative-side input node of inverter 3 through DC negative bus Ln. Capacitor Cd is connected between buses Lp and Ln and smooths DC voltage VDC between buses Lp and Ln. An instantaneous value of DC voltage VDC is detected by control device 5.

Converter 1 is controlled by control device 5 and converts three phase AC power from commercial AC power supply 6 to DC power when three phase AC power is supplied normally from commercial AC power supply 6 (in a sound state of commercial AC power supply 6). DC power generated by converter 1 is supplied to bidirectional chopper 2 and inverter 3 through buses Lp and Ln.

In a sound state of commercial AC power supply 6, control device 5 controls converter 1 such that terminal-to-terminal voltage VDC of capacitor Cd becomes reference voltage VDCr1. In the switching period in which the inverter power feed mode of supplying AC power from inverter 3 to load 8 and the bypass power feed mode of supplying AC power from bypass AC power supply 7 to load 8 are switched, control device 5 controls converter 1 such that terminal-to-terminal voltage VDC of capacitor Cd becomes reference voltage VDCr2 higher than reference voltage VDCr1, thereby preventing flowing of the circulating current.

Reference voltage VDCr1 is set to a voltage lower than a voltage twice the peak values of three phase AC voltages Vu1, Vv1, Vw1 of commercial AC power supply 6. Reference voltage VDCr2 is set to a voltage equal to or higher than a voltage twice the peak values of three phase AC voltages Vu1, Vv1, Vw1 of commercial AC power supply 6. The relation between reference voltages VDCr1, VDCr2 and circulating current will be described in detail later.

When supply of three phase AC power from commercial AC power supply 6 is stopped (at the time of a power failure of commercial AC power supply 6), the operation of converter 1 is stopped. AC filter F1 and converter 1 constitute a forward converter that converts three phase AC power from commercial AC power supply 6 to DC power.

Bidirectional chopper 2 is controlled by control device 5, stores DC power generated by converter 1 into battery B1 in a sound state of commercial AC power supply 6, and supplies DC power in battery B1 to inverter 3 through buses Lp and Ln in response to occurrence of a power failure of commercial AC power supply 6. An instantaneous value of terminal-to-terminal voltage VB of battery B1 is detected by control device 5.

Control device 5 controls bidirectional chopper 2 such that terminal-to-terminal voltage VB of battery B1 becomes reference voltage VBr in a sound state of commercial AC power supply 6 and controls bidirectional chopper 2 such that terminal-to-terminal voltage VDC of capacitor Cd becomes reference voltage VDCr1 at the time of a power failure of commercial AC power supply 6.

Inverter 3 is controlled by control device 5 and converts DC power supplied from converter 1 and bidirectional chopper 2 to three phase AC power with a commercial frequency.

Each of three output nodes of inverter 3 is connected to one terminal of the corresponding one of reactors L4 to L6. The other terminal of each of reactors L4 to L6 is connected to one terminal of the corresponding one of switches S1 to S3, and the other terminals of switches S1 to S3 are respectively connected to three AC input terminals 8a to 8c of load 8. Switches S1 to S3 correspond to an embodiment of "first switch". One electrode of each of capacitors C4 to C6 is connected to the other terminal of the corresponding one of reactors L4 to L6, and the other electrodes of capacitors C4 to C6 are connected together to the other electrodes of capacitors C1 to C3.

Capacitors C4 to C6 and reactors L4 to L6 constitute an AC filter F2. AC filter F2 is a low pass filter, allows AC current with a commercial frequency to flow from inverter 3 to load 8, and prevents a signal with a switching frequency from flowing from inverter 3 to load 8. In other words, AC filter F2 converts three phase rectangular wave voltage output from inverter 3 to sinusoidal three phase AC voltages Va, Vb, and Vc.

Instantaneous values of three phase AC voltages Va to Vc are detected by control device 5. Current detectors CT4 to CT6 detect AC currents I4 to I6 flowing through reactors L4 to L6, respectively, and apply a signal indicating a detected value to control device 5.

Control device 5 controls inverter 3 such that AC output voltages Va to Vc become AC output voltages Vu2, Vv2, and Vw2, respectively, based on AC output voltages Va to Vc of inverter 3, AC output voltages Vu2, Vv2, and Vw2 of bypass AC power supply 7, and AC currents I4 to I6.

Switches S4 to S6 each have one terminal connected to the corresponding one of AC output terminals 7a to 7c of bypass AC power supply 7 and have the other terminals respectively connected to AC input terminals 8a to 8c of load 8. Switches S1 to S6 are controlled by control device 5. Switches S4 to S6 correspond to an embodiment of "second switch".

In the inverter power feed mode (first power feed mode) in which three phase AC power generated by inverter 3 is supplied to load 8, control device 5 turns on switches S1 to S3 and turns off switches S4 to S6.

In the bypass power feed mode (second power feed mode) in which three phase AC power from bypass AC power supply 7 is supplied to load 8, control device 5 turns off switches S1 to S3 and turns on switches S4 to S6. In the lap power feed mode (third power feed mode) in which three phase AC power from both of inverter 3 and bypass AC power supply 7 is supplied to load 8, control device 5 turns on switches S1 to S6.

Operation unit 4 (selector) includes a plurality of buttons operated by a user of the uninterruptible power supply apparatus and an image display unit presenting a variety of information. The user can operate operation unit 4 to power on and off the uninterruptible power supply apparatus and select one mode of the automatic operation mode, the bypass power feed mode, and the inverter power feed mode.

Control device 5 controls the entire uninterruptible power supply apparatus based on a signal from operation unit 4, AC output voltages Vu1, Vv1, and Vw1 of commercial AC power supply 6, AC input currents I1 to I3, terminal-to-terminal voltage VDC of capacitor Cd, terminal-to-terminal voltage VB of battery B1, AC output currents I4 to I6, AC output voltages Va to Vc, and AC output voltages Vu2, Vv2, and Vw2 of bypass AC power supply 7, and the like.

The operation of this uninterruptible power supply apparatus will now be described briefly. When the automatic operation mode is selected using operation unit 4 in a sound state of commercial AC power supply 6, converter 1 is controlled such that terminal-to-terminal voltage VDC of capacitor Cd becomes reference voltage VDCr1, bidirectional chopper 2 is controlled such that terminal-to-terminal voltage VB of battery B1 becomes reference voltage VBr, and inverter 3 is controlled such that AC output voltages Va to Vc become AC output voltages Vu2, Vv2, and Vw2, respectively, of bypass AC power supply 7.

Furthermore, switches S1 to S3 are turned on and switches S4 to S6 are turned off, and inverter 3 is connected to load 8 through AC filter F2 and switches S1 to S3. AC output voltages Va to Vc are then supplied to load 8 through switches S1 to S3 to drive load 8.

When a power failure of commercial AC power supply 6 occurs, the operation of converter 1 is stopped, bidirectional chopper 2 is controlled such that terminal-to-terminal voltage VDC of capacitor Cd becomes reference voltage VDCr1, and inverter 3 is controlled such that AC output voltages Va to Vc become AC output voltages Vu2, Vv2, and Vw2, respectively, of bypass AC power supply 7.

When DC power of battery B1 is consumed and terminal-to-terminal voltage VB of battery B1 reaches a lower limit value, the operation of bidirectional chopper 2 and inverter 3 is stopped. Thus, even when a power failure of commercial AC power supply 6 occurs, the operation of load 8 can be continued for a period until the terminal-to-terminal voltage VB of battery B1 reaches the lower limit value.

When the inverter power feed mode is selected using operation unit 4 in a sound state of commercial AC power supply 6, converter 1 is controlled such that terminal-to-terminal voltage VDC of capacitor Cd becomes reference voltage VDCr1, and bidirectional chopper 2 is controlled such that terminal-to-terminal voltage VB of battery B1 becomes reference voltage VBr, in the same manner as in the automatic operation mode. Inverter 3 is controlled such that AC output voltages Va to Vc become AC output voltages Vu2, Vv2, and Vw2, respectively, of bypass AC power supply 7, switches S1 to S3 are turned on and switches S4 to S6 are turned off.

When the bypass power feed mode is selected using operation unit 4 in the inverter power feed mode, converter 1 is controlled such that terminal-to-terminal voltage VDC of capacitor Cd becomes reference voltage VDCr2 higher than reference voltage VDCr1.

When VDC=VDCr2 is reached, the lap power feed mode is executed for a predetermined period of time, all of switches S1 to S6 are turned on, and three phase AC power is supplied from both of inverter 3 and bypass AC power supply 7 to load 8. At this point of time, since VDC=VDCr2 is attained, circulating current does not flow through the uninterruptible power supply apparatus.

When the lap power feed mode ends, switches S1 to S3 are turned off and only switches S4 to S6 are turned on. Converter 1 is controlled so that terminal-to-terminal voltage VDC of capacitor Cd is lowered to reference voltage VDCr1, and the switching from the inverter power feed mode to the bypass power feed mode is completed. In the bypass power feed mode, three phase AC power is supplied from bypass AC power supply 7 to load 8 through switches S4 to S6 to drive load 8. In the bypass power feed mode, for example, repair or routine check of converter 1, bidirectional chopper 2, inverter 3, battery B1, etc. is performed.

When the inverter power feed mode is selected using operation unit 4 in the bypass power feed mode, converter 1 is controlled such that terminal-to-terminal voltage VDC of capacitor Cd becomes reference voltage VDCr2 higher than reference voltage VDCr1.

When VDC=VDCr2 is reached, the lap power feed mode is executed for a predetermined period of time, all of switches S1 to S6 are turned on, and three phase AC power is supplied from both of inverter 3 and bypass AC power supply 7 to load 8.

When the lap power feed mode ends, switches S4 to S6 are turned off, only switches S1 to S3 are turned on, terminal-to-terminal voltage VDC of capacitor Cd is lowered to reference voltage VDCr1 by converter 1, and the switching from the bypass power feed mode to the inverter power feed mode is completed.

Figure 2:
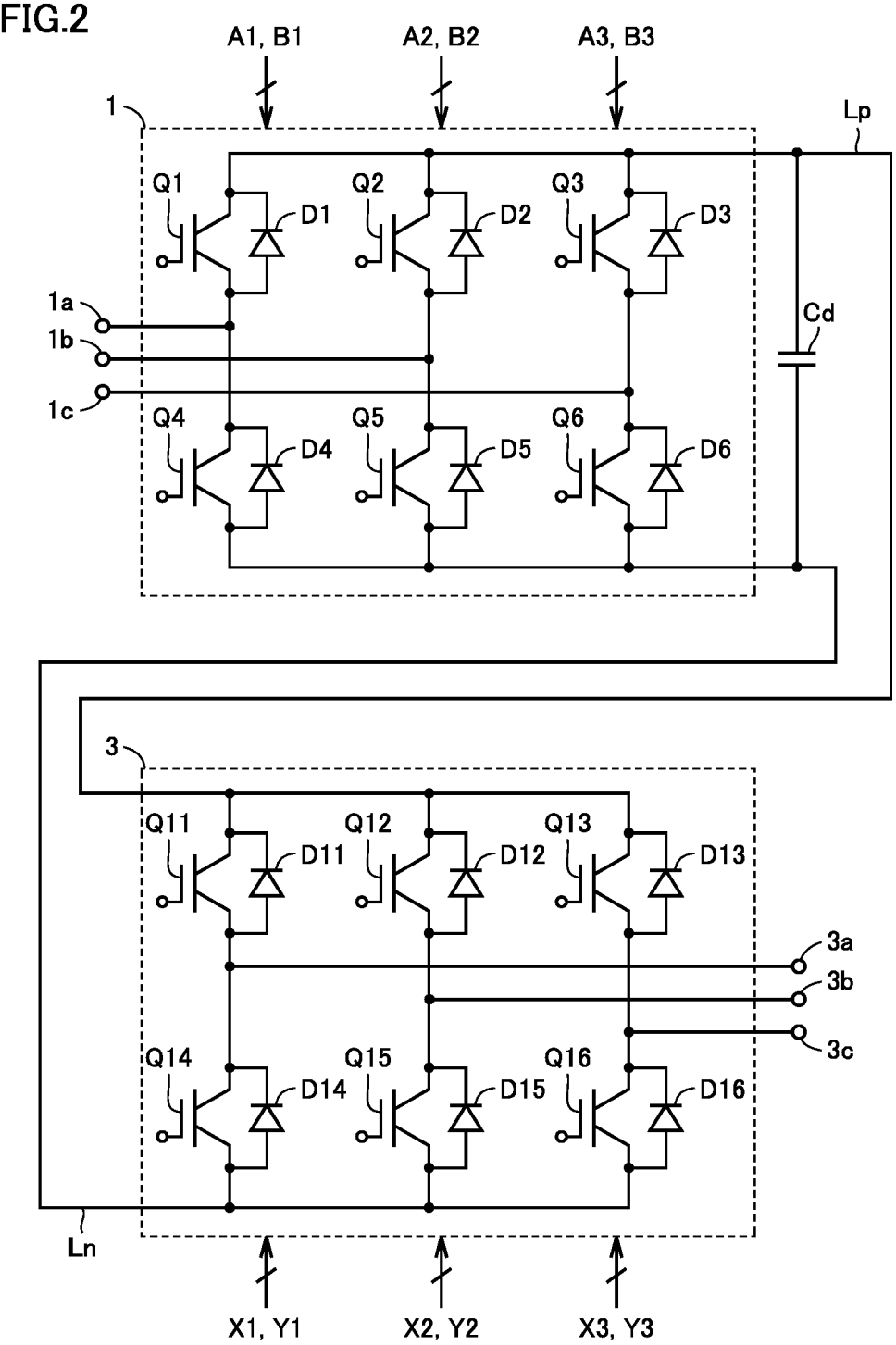
FIG. 2 is a circuit diagram showing a configuration of a converter and an inverter shown in FIG. 1.

The relation between circulating current flowing through such an uninterruptible power supply apparatus and reference voltages VDCr1, VDCr2 will now be described in detail. FIG. 2 is a circuit diagram showing a configuration of converter 1 and inverter 3. In FIG. 2, converter 1 includes IGBTs (Insulated Gate Bipolar Transistors) Q1 to Q6 and diodes D1 to D6. The IGBTs constitute a switching element. The collectors of IGBTs Q1 to Q3 are connected together to DC positive bus Lp, and the emitters thereof are respectively connected to input nodes 1a, 1b, and 1c.

Input nodes 1a, 1b, and 1c are respectively connected to the other terminals of reactors L1 to L3 (FIG. 1). The collectors of IGBTs Q4 to Q6 are respectively connected to input nodes 1a, 1b, and 1c, and the emitters thereof are connected together to DC negative bus Ln. Diodes D1 to D6 are respectively connected in anti-parallel with IGBTs Q1 to Q6.

IGBTs Q1 and Q4 are respectively controlled by gate signals A1 and B1, IGBTs Q2 and Q5 are respectively controlled by gate signals A2 and B2, and IGBTs Q3 and Q6 are respectively controlled by gate signals A3 and B3. Gate signals B1, B2, and B3 are inversion signals of gate signals A1, A2, and A3, respectively.

IGBTs Q1 to Q3 turn on when gate signals A1, A2, and A3 are brought to "H" level, respectively, and turn off when gate signals A1, A2, and A3 are brought to "L" level, respectively. IGBTs Q4 to Q6 turn on when gate signals B1, B2, and B3 are brought to "H" level, respectively, and turn off when gate signals B1, B2, and B3 are brought to "L" level, respectively.

Each of gate signals A1, B1, A2, B2, A2, and B2 is a pulse signal train and a PWM (Pulse Width Modulation) signal. The phase of gate signal A1, B1, the phase of gate signal A2, B2, and the phase of gate signal A3, B3 are basically shifted from each other by 120 degrees. Gate signals A1, B1, A2, B2, A3, and B3 are generated by control device 5. For example, when the level of AC input voltage Vu1 is higher than the level of AC input voltage Vv1, IGBTs Q1 and Q5 are turned on, and current flows from input node 1a to input node 1b through IGBT Q1, DC positive bus Lp, capacitor Cd, DC negative bus Ln, and IGBT Q5 to charge capacitor Cd.

Conversely, when the level of AC input voltage Vv1 is higher than the level of AC input voltage Vu1, IGBTs Q2 and Q4 are turned on, and current flows from input node 1b to input node 1a through IGBT Q2, DC positive bus Lp, capacitor Cd, DC negative bus Ln, and IGBT Q4 to charge capacitor Cd. This is the same in other cases.

Each of IGBTs Q1 to Q6 is turned on and off at a predetermined timing by gate signals A1, B1, A2, B2, A3, and B3, and the ON time of each of IGBTs Q1 to Q6 is adjusted, whereby three phase AC voltage applied to input nodes 6a to 6c can be converted to DC voltage VDC (terminal-to-terminal voltage of capacitor Cd).

Inverter 3 includes IGBTs Q11 to Q16 and diodes D11 to D16. The IGBTs constitute a switching element. The collectors of IGBTs Q11 to Q13 are connected together to DC positive bus Lp, and the emitters thereof are respectively connected to output nodes 3a, 3b, and 3c. Each of output nodes 3a, 3b, and 3c is connected to one terminal of the corresponding one of reactors L4 to L6 (FIG. 1). The collectors of IGBTs Q14 to Q16 are respectively connected to output nodes 3a, 3b, and 3c, and the emitters thereof are connected together to DC negative bus Ln. Diodes D11 to D16 are respectively connected in anti-parallel with IGBTs Q11 to Q16.

IGBTs Q11 and Q14 are respectively controlled by gate signals X1 and Y1, IGBTs Q12 and Q15 are respectively controlled by gate signals X2 and Y2, and IGBTs Q13 and Q16 are respectively controlled by gate signals X3 and Y3. Gate signals Y1, Y2, and Y3 are inversion signals of gate signals X1, X2, and X3, respectively.

IGBTs Q11 to Q13 turn on when gate signals S1, X2, and X3 are brought to "H" level, respectively, and turn off when gate signals X1, X2, and X3 are brought to "L" level, respectively. IGBTs Q14 to Q16 turn on when gate signals Y1, Y2, and Y3 are brought to "H" level, respectively, and turn off when gate signals Y1, Y2, and Y3 are brought to "L" level, respectively.

Each of gate signals X1, Y2, X3, Y1, X2, and Y3 is a pulse signal train and a PWM signal. The phase of gate signal X1, Y1, the phase of gate signal X2, Y2, and the phase of gate signal X3, Y3 are basically shifted from each other by 120 degrees. Gate signals X1, Y1, X2, Y2, X3, and Y3 are generated by control device 5.

For example, when IGBTs Q11 and Q15 turn on, DC positive bus Lp is connected to output node 3a through IGBT Q11, output node 3b is connected to DC negative bus Ln through IGBT Q15, and a positive voltage is output between output nodes 3a and 3b.

When IGBTs Q12 and Q14 turn on, DC positive bus Lp is connected to output node 3b through IGBT Q12, output node 3a is connected to DC negative bus Ln through IGBT Q14, and a negative voltage is output between output nodes 3a and 3b.

Each of IGBTs Q11 to Q16 is turned on and off at a predetermined timing by gate signals X1, Y1, X2, Y2, X3, and Y3, and the ON time of each of IGBTs Q11 to Q16 is adjusted, whereby DC voltage VDC between buses Lp and Ln can be converted to three phase AC voltages Va, Vb, and Vc.

Figure 3:
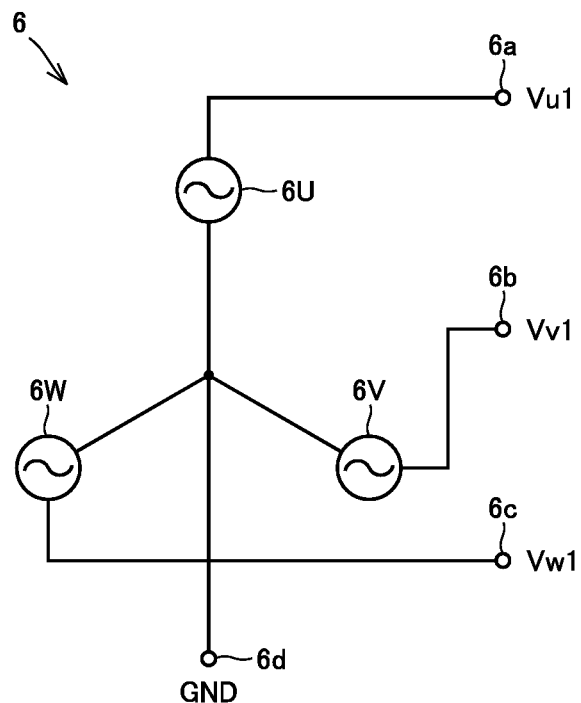
FIG. 3 is an equivalent circuit diagram showing a configuration of a commercial AC power supply shown in FIG. 1.

FIG. 3 is an equivalent circuit diagram showing a configuration of commercial AC power supply 6. In FIG. 3, commercial AC power supply 6 includes three phase AC power supplies 6U, 6V, and 6W star-connected (Y-connected) to neutral point terminal 6d. AC power supply 6U is connected between AC output terminal 6a and neutral point terminal 6d and outputs AC voltage Vu1 to AC output terminal 6a. AC power supply 6V is connected between AC output terminal 6b and neutral point terminal 6d and outputs AC voltage Vv1 to AC output terminal 6b. AC power supply 6W is connected between AC output terminal 6c and neutral point terminal 6d and outputs AC voltage Vw1 to AC output terminal 6c.

Each of AC voltages Vu1, Vv1, and Vw1 changes sinusoidally at a commercial frequency (for example, 60 Hz). The peak values √2 times the effective value) of AC voltages Vu1, Vv1, and Vw1 are the same, and the phases thereof are shifted from each other by 120 degrees. AC power supplies 6U, 6V, and 6W correspond to, for example, three phase windings at the last stage included in a three phase transformer at the last stage of commercial AC power supply 6.

Figure 4:
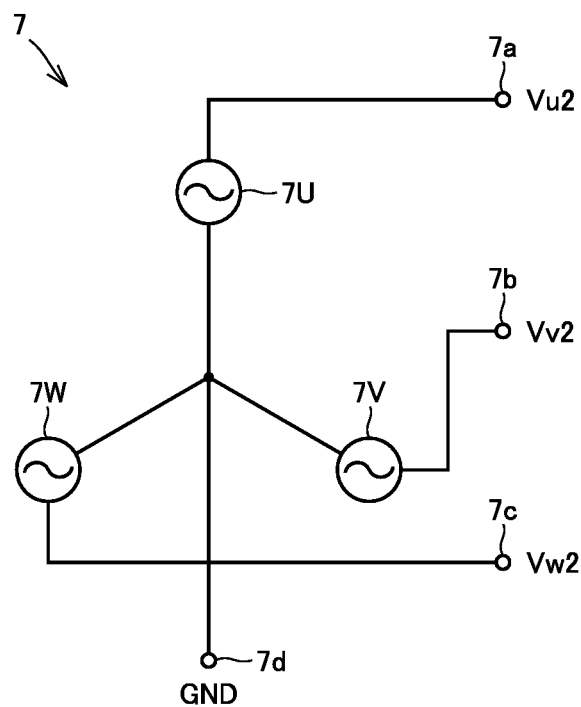
FIG. 4 is an equivalent circuit diagram showing a configuration of a bypass AC power supply shown in FIG. 1.

FIG. 4 is an equivalent circuit diagram showing a configuration of bypass AC power supply 7. In FIG. 4, bypass AC power supply 7 includes three phase AC power supplies 7U, 7V, and 7W star-connected to neutral point terminal 7d. AC power supply 7U is connected between AC output terminal 7a and neutral point terminal 7d and outputs AC voltage Vu2 to AC output terminal 7a. AC power supply 7V is connected between AC output terminal 7b and neutral point terminal 7d and outputs AC voltage Vv2 to AC output terminal 7b. AC power supply 7W is connected between AC output terminal 7c and neutral point terminal 7d and outputs AC voltage Vw2 to AC output terminal 7c.

Each of AC voltages Vu2, Vv2, and Vw2 changes sinusoidally at a commercial frequency. The peak values of AC voltages Vu2, Vv2, and Vw2 are the same, and the phases thereof are shifted from each other by 120 degrees. AC power supplies 7U, 7V, and 7W correspond to, for example, a three phase coil of a self-generator.

In the inverter power feed mode and the bypass power feed mode, the phases (and peak values) of AC voltages Vu2, Vv2, and Vw2 of bypass AC power supply 7 match the phases (and peak values) of AC voltages Vu1, Vv1, and Vw1 of commercial AC power supply 6. In this state, no circulating current flows through the uninterruptible power supply apparatus.

However, in the lap power feed mode, when switches S1 to S3 or switches S4 to S6 are turned on, load current of bypass AC power supply 7 significantly fluctuates, and the phases and peak values of AC voltages Vu2, Vv2, and Vw2 fluctuate. AC voltages Vu2, Vv2, and Vw2 then do not match AC voltages Vu1, Vv1, and Vw1, respectively.

FIGS. 5(A) to 5(C) are diagrams showing the relation between AC voltages Vu1, Vv1, and Vw1 of commercial AC power supply 6 and AC voltages Vu2, Vv2, and Vw2 of bypass AC power supply 7. Each of AC voltages Vu1, Vv1, Vw1, Vu2, Vv2, and Vw2 is illustrated by a vector. AC voltages Vu1, Vv1, and Vw1 are out of phase by 120 degrees, and AC voltages Vu2, Vv2, and Vw2 are out of phase by 120 degrees. FIG. 5(A) shows a case where the phases of AC voltages Vu2, Vv2, and Vw2 match the phases of AC voltages Vu1, Vv1, and Vw1, respectively.

FIG. 5(B) shows a case where the phases of AC voltages Vu2, Vv2, and Vw2 lag behind the phases of AC voltages Vu1, Vv1, and Vw1, respectively, by 60 degrees. For example, AC voltage Vu1 and AC voltage Vw2 are out of phase by 180 degrees. When AC voltage Vu1 is a positive peak value and AC voltage Vw2 is a negative peak value, voltage ΔV12=Vu1-Vw2 that is the difference between AC voltage Vu1 and AC voltage Vw2 is the sum of peak values of AC voltages Vu1 and Vw2. Conversely, when AC voltage Vu1 is a negative peak value and AC voltage Vw2 is a positive peak value, voltage ΔV21=Vw2-Vu1 that is the difference between AC voltage Vw2 and AC voltage Vu1 is the sum of peak values of AC voltages Vu1 and Vw2.

FIG. 5(C) shows a case where the phases of AC voltages Vu2, Vv2, and Vw2 are ahead of the phases of AC voltages Vu1, Vv1, and Vv1, respectively, by 60 degrees. For example, AC voltage Vu1 and AC voltage Vv2 are out of phase by 180 degrees. When AC voltage Vu1 is a positive peak value and AC voltage Vv2 is a negative peak value, voltage ΔV12=Vu1-Vv2 that is the difference between AC voltage Vu1 and AC voltage Vv2 is the sum of peak values of AC voltages Vu1 and Vv2. Conversely, when AC voltage Vu1 is a negative peak value and AC voltage Vv2 is a positive peak value, voltage ΔV21=Vv2-Vu1 that is the difference between AC voltage Vv2 and AC voltage Vu1 is the sum of peak values of AC voltages Vu1 and Vv2.

If in the lap power feed mode, terminal-to-terminal voltage VDC of capacitor Cd is smaller than the sum of peak values of AC voltages Vu1, Vv1, Vw1 and peak values of AC voltages Vu2, Vv2, Vw2, the following problem arises. For example, as shown in FIG. 5(B), when AC voltages Vu1 and Vw2 are out of phase 180 degrees and voltage ΔV12=Vu1-Vw2 that is the difference between AC voltages Vu1 and Vw2 is the sum of peak values of AC voltages Vu1 and Vw2, circulating current IC flows through the path shown in FIG. 6.

Figure 6:
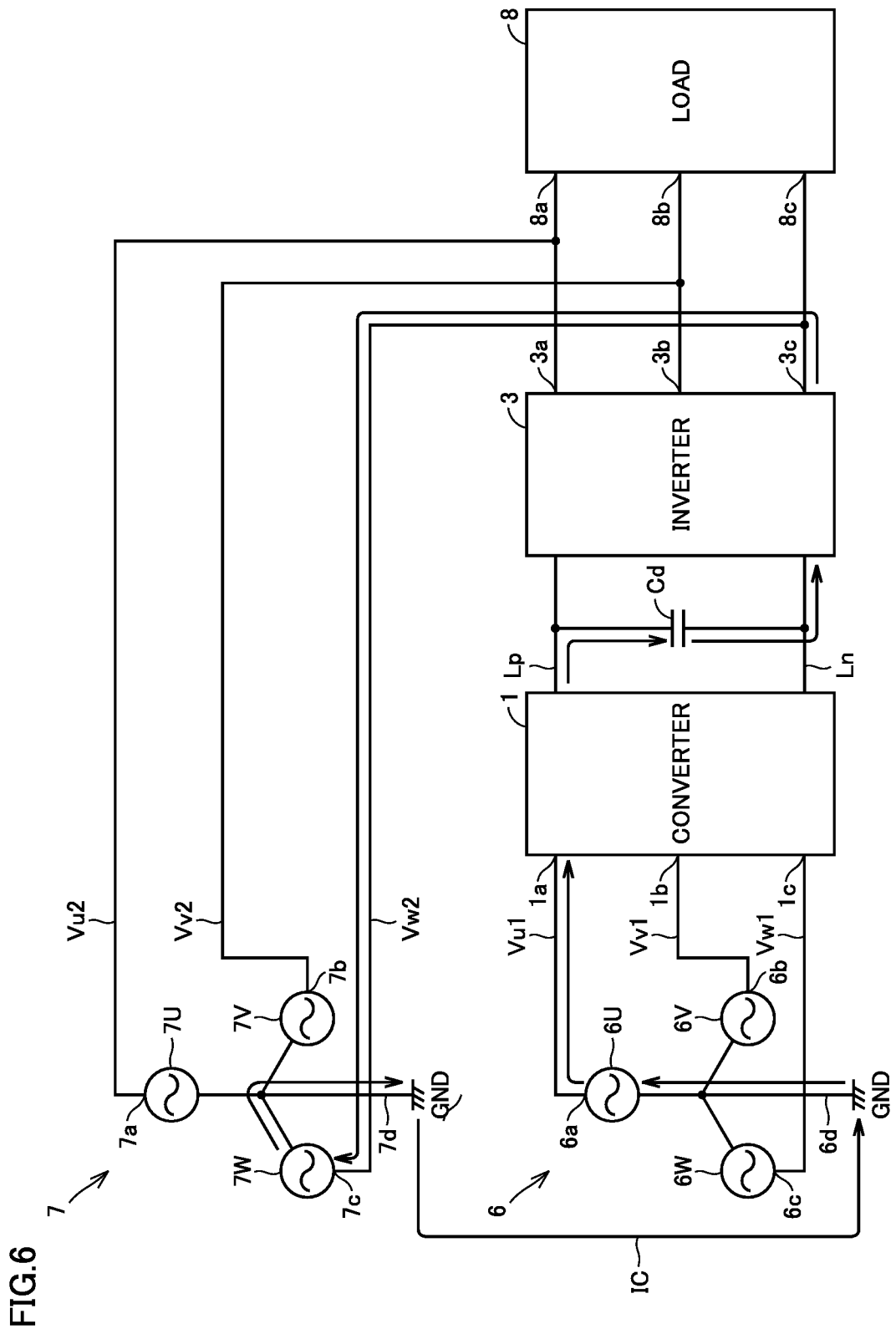
FIG. 6 is a circuit block diagram for explaining the effect of the present invention.

That is, circulating current IC flows through a path from one terminal (output terminal 6a) of AC power supply 6U to the other terminal of AC power supply 6U through input node 1a of converter 1, diode D1 (FIG. 2), DC positive bus Lp, capacitor Cd, DC negative bus Ln, diode D16 (FIG. 2), output node 3c of inverter 3, AC power supply 7W, neutral point terminal 7d, the line of ground voltage GND, and neutral point terminal 6d. In FIG. 6, for the sake of simplicity of the drawing and the description, filters F1, F2, switches S1 to S6 turned on, and the like are not illustrated.

Figure 7:
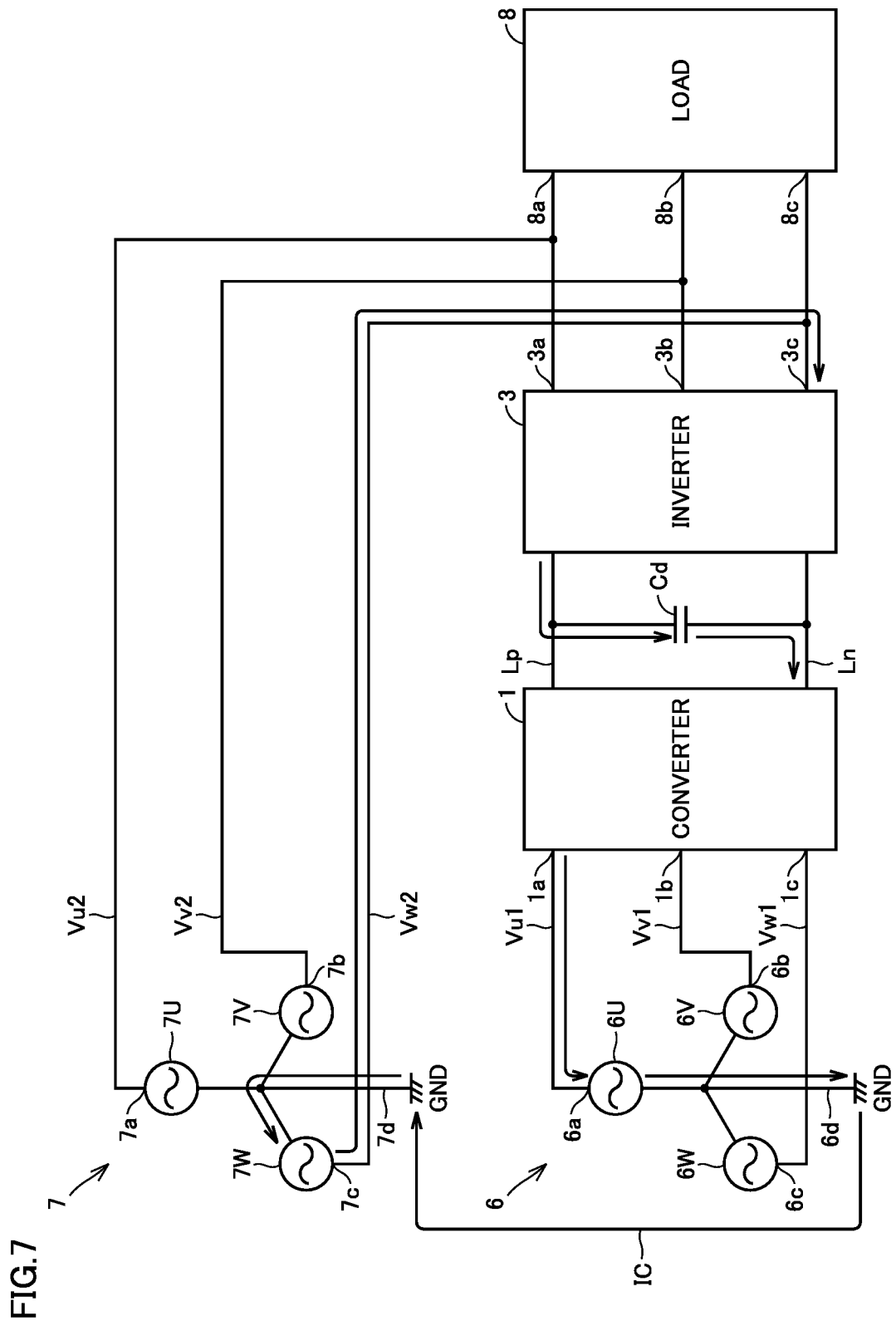
FIG. 7 is another circuit block diagram for explaining the effect of the present invention.

Conversely, when voltage ΔV21=Vw2-Vu1 that is the difference between AC voltages Vw2 and Vu1 is the sum of peak values of AC voltages Vu1 and Vw2, circulating current IC flows through the path shown in FIG. 7. That is, circulating current IC flows through a path from one terminal (output terminal 7a) of AC power supply 7U to the other terminal of AC power supply 7U through output node 3c of inverter 3, diode D13 (FIG. 2), DC positive bus Lp, capacitor Cd, DC negative bus Ln, diode D4 (FIG. 2), input node 1a of converter 1, AC power supply 6U, neutral point terminal 6d, the line of ground voltage GND, and neutral point terminal 7d.

When circulating current IC flows, circulating current IC charges capacitor Cd, terminal-to-terminal voltage VDC of capacitor Cd may exceed upper limit value VDCH, and control device 5 may determine that abnormality has occurred, so that the operation of the uninterruptible power supply apparatus may be stopped and the operation of load 8 may be stopped. The detected values of current detectors CT1 to CT6 may exceed upper limit value IH, and the control device 5 may determine that abnormality has occurred, so that the operation of the uninterruptible power supply apparatus may be stopped and the operation of load 8 may be stopped.

Then, in the present embodiment, in the lap power feed mode, terminal-to-terminal voltage VDC of capacitor Cd is set to reference voltage VDCr2 equal to or higher than a voltage of the sum of the peak values of AC voltages Vu1, Vv1, Vw1 and the peak values of AC voltages Vu2, Vv2, Vw2 to prevent circulating current IC from flowing through the uninterruptible power supply apparatus.

In the present embodiment, in the inverter power feed mode and the bypass power feed mode, terminal-to-terminal voltage VDC of capacitor Cd is set to reference voltage VDCr1 lower than a voltage of the sum of peak values of AC voltage Vu1, Vv1, Vw1 and peak values of AC voltage Vu2, Vv2, Vw2 to reduce power consumption and improve the efficiency.

When bypass AC power supply 7 is stable, AC output voltages Vu2, Vv2, and Vw2 of bypass AC power supply 7 match AC output voltages Vu1, Vv1, and Vw1 of commercial AC power supply 6, and therefore the voltage of the sum of peak values of AC voltages Vu1, Vv1, and Vw1 and peak values of AC voltages Vu2, Vv2, and Vw2 is equal to the voltage twice the peak values of AC voltages Vu1, Vv1, and Vw1. The peak values of AC voltages Vu1, Vv1, and Vw1 are the same value.

For example, the effective value of AC voltage Vu1 is 277 V and the peak value thereof is 392 V. The voltage twice the peak value of AC voltage Vu1 is 784 V. Reference voltage VDCr1 is set to 750 V lower than 784 V. Reference voltage VDCr2 is set to 920 V higher than 784 V. Reference voltage VDCr2 is set to a value lower than upper limit value VDCH (for example, 1000 V) of terminal-to-terminal voltage VDC of capacitor Cd.

As a result, in the lap power feed mode, for example, even when AC voltage Vu1 becomes a positive peak value (+392 V) and AC voltage Vw2 becomes a negative peak value (−392 V), diodes D1 and D16 (FIG. 2) do not turn on and circulating current IC does not flow, because terminal-to-terminal voltage VDC=VDCr2 (920 V) of capacitor Cd is higher than the sum voltage (784 V) of the peak values of AC voltages Vu1 and Vw2.

Conversely, even when AC voltage Vu1 becomes a negative peak value (−392 V) and AC voltage Vw2 becomes a positive peak value (+392 V), diodes D13 and D4 (FIG. 2) do not turn on and circulating current IC does not flow, because terminal-to-terminal voltage VDC=VDCr2 (920 V) of capacitor Cd is higher than the voltage (784 V) of the sum of peak values of AC voltages Vu1 and Vw2. As circulating current IC does not flow, overcurrent or overvoltage of capacitor Cd is not detected, the operation of the uninterruptible power supply apparatus is not stopped, and the operation of load 8 is not stopped.

Figure 8:
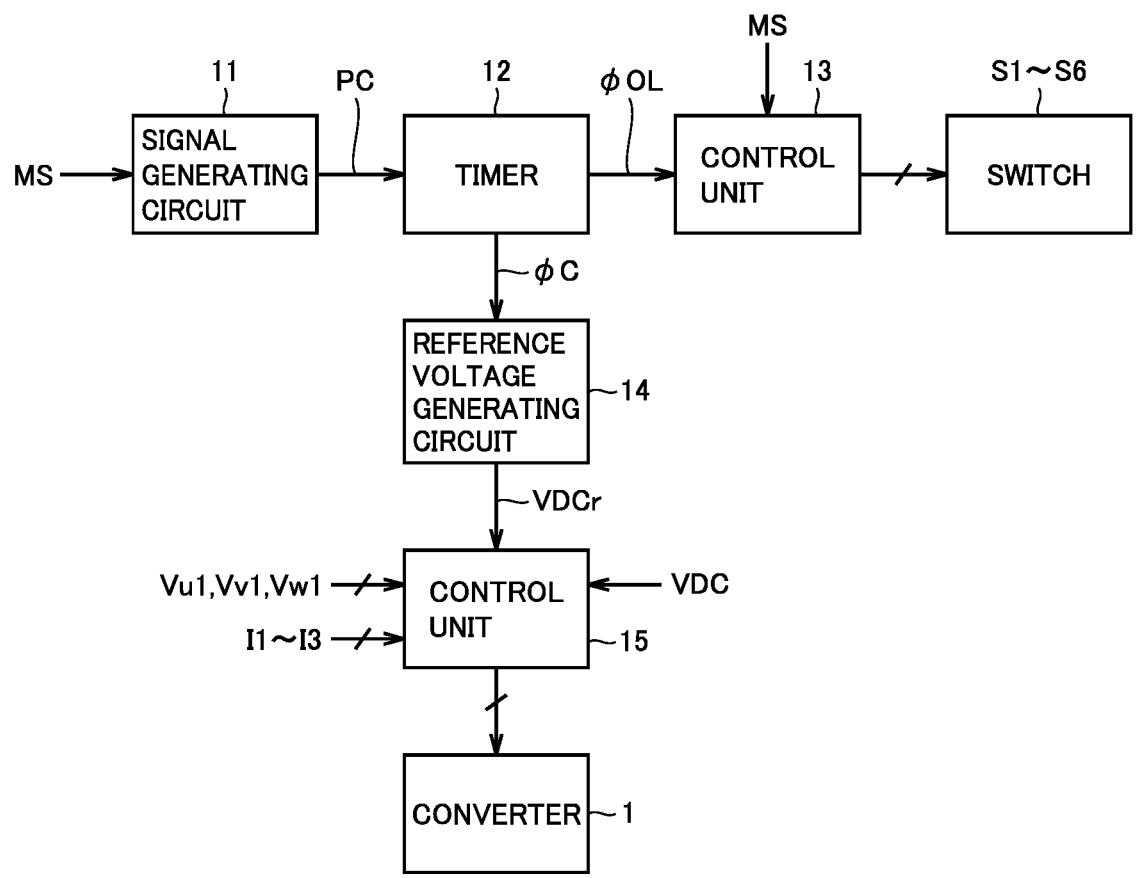
FIG. 8 is a block diagram showing the main part of a control device shown in FIG. 1.

A method of controlling converter 1 and switches S1 to S6 will now be described. FIG. 8 is a block diagram showing a configuration of a part of control device 5 that is related to control of converter 1 and switches S1 to S6. In FIG. 8, control device 5 includes a signal generating circuit 11, a timer 12, control units 13 and 15, and a reference voltage generating circuit 14.

Operation unit 4 (FIG. 1) brings mode select signal MS to "L" level when the user of the uninterruptible power supply apparatus selects the inverter power feed mode, and brings mode select signal MS to "H" level when the user selects the bypass power feed mode. Signal generating circuit 11 raises switch command signal PC to "H" level for a predetermined period of time, in response to each of the rising edge and the falling edge of mode select signal MS from operation unit 4.

Timer 12 successively measures first time T1, second time T2, and third time T3, in response to the rising edge of switch command signal PC. Timer 12 brings switch signal φC to "H" level that is the active level from the rising edge of switch command signal PC to third time T3. Further, timer 12 brings overlap command signal φOL to "H" level that is the active level from first time T1 to second time T2.

Control unit 13 controls switches S1 to S6 in accordance with mode select signal MS and overlap command signal φOL. When both of mode select signal MS and overlap command signal φOL are "L" level, control unit 13 turns on switches S1 to S3 and turns off switches S4 to S6. Control unit 13 corresponds to an embodiment of "first control unit".

When overlap command signal φOL is "H" level, control unit 13 turns on all of switches S1 to S6. When mode select signal MS is "H" level and overlap command signal φOL is "L" level, control unit 13 turns on switches S4 to S6 and turns off switches S1 to S3.

Reference voltage generating circuit 14 outputs reference voltage VDCr based on switch signal φC from timer 12. When switch signal φC is L level that is the inactive level, reference voltage VDCr is brought to reference voltage VDCr1. When switch signal φC is H level that is the active level, reference voltage VDCr is brought to reference voltage VDCr2.

Control unit 15 operates based on AC input voltages Vu1, Vv1, Vw1, three phase input currents I1 to I3, DC voltage VDC, and output voltage VDCr1 (or VDCr2) of reference voltage generating circuit 14 and controls converter 1 such that terminal-to-terminal voltage VDC of capacitor Cd matches output voltage VDCr1 (or VDCr2) of reference voltage generating circuit 14. Control unit 15 corresponds to an embodiment of "second control unit".

Figure 9:
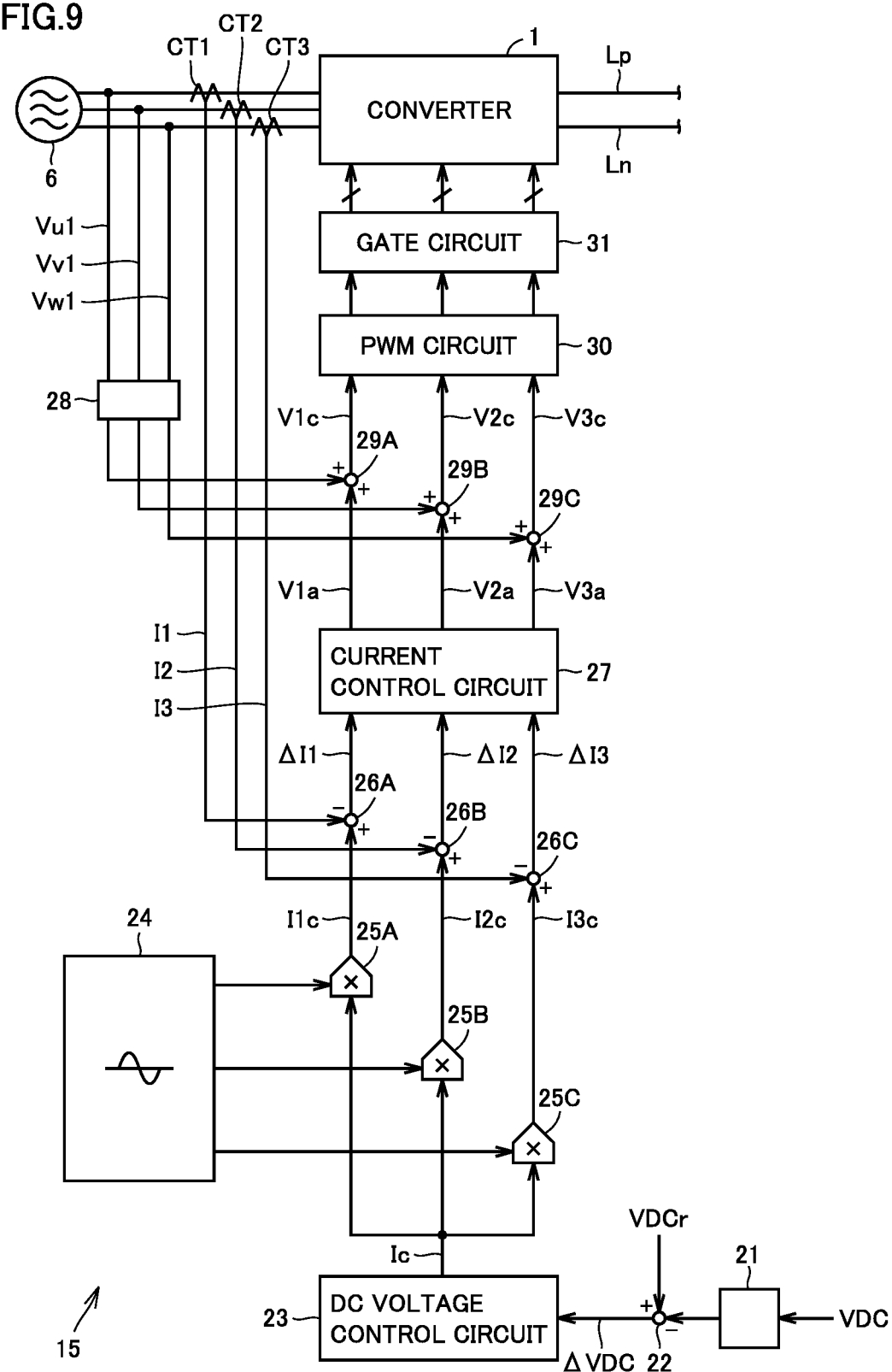
FIG. 9 is a circuit block diagram showing a configuration of a control unit 15 shown in FIG. 8.

FIG. 9 is a circuit block diagram showing a configuration of control unit 15. In FIG. 9, control unit 15 includes voltage detectors 21 and 28, subtracters 22 and 26A to 26C, a DC voltage control circuit 23, a sine wave generating circuit 24, multipliers 25A to 25C, a current control circuit 27, adders 29A to 29C, a PWM circuit 30, and a gate circuit 31.

Voltage detector 21 detects terminal-to-terminal voltage VDC of capacitor Cd and outputs a signal indicating the detected value. Subtracter 15 subtracts terminal-to-terminal voltage VDC of capacitor Cd from reference voltage VDCr to obtain deviation ΔVDC=VDCr−VDC between reference voltage VDCr1 and DC voltage VDC.

DC voltage control circuit 23 calculates current command value Ic for controlling AC input currents I1 to I3 of converter 1 such that deviation ΔVDC=VDCr−VDC becomes zero. DC voltage control circuit 23 calculates current command value Ic, for example, by performing proportional operation or proportional integral operation of deviation ΔVDC.

Sine wave generating circuit 24 generates a three-phase sine wave signal having the same phase as three phase AC voltages Vu1, Vv1, and Vw1 from commercial AC power supply 6. Multipliers 25A to 25C multiply the three phase sine wave signals by current command value Ic to generate three phase current command values I1c to I3c, respectively.

Subtracter 26A calculates deviation ΔI1=I1c−I1 between current command value I1c and AC current I1 detected by current detector CT1. Subtracter 26B calculates deviation ΔI2=I2c−I2 between current command value I2c and AC current I2 detected by current detector CT2. Subtracter 26C calculates deviation ΔI3=I3c−I3 between current command value I3c and AC current I3 detected by current detector CT3.

Current control circuit 27 generates voltage command values V1a, V2a, and V3a such that each of deviations ΔI1, ΔI2, and ΔI3 becomes zero. Current control circuit 27 generates voltage command values V1a, V2a, and V3a, for example, by performing proportional control or proportional integral control of deviations ΔI1, ΔI2, and ΔI3. Voltage detector 28 detects instantaneous values of three phase AC voltages Vu1, Vv1, and Vw1 from commercial AC power supply 6 and outputs signals indicating their detected values.

Adder 29A adds voltage command value V1a to AC voltage Vu1 detected by voltage detector 28 to generate voltage command value V1c. Adder 29B adds voltage command value V2a to AC voltage Vv1 detected by voltage detector 28 to generate voltage command value V2c. Adder 29C adds voltage command value V3a to AC voltage Vw1 detected by voltage detector 28 to generate voltage command value V3c.

PWM circuit 30 generates PWM control signals φ1 to φ3 for controlling converter 1, based on voltage command values V1c to V3c. Gate circuit 31 generates gate signals A1, B1, A2, B2, A2, and B2 (FIG. 2) based on PWM control signals φ1 to φ3.

Figure 10:
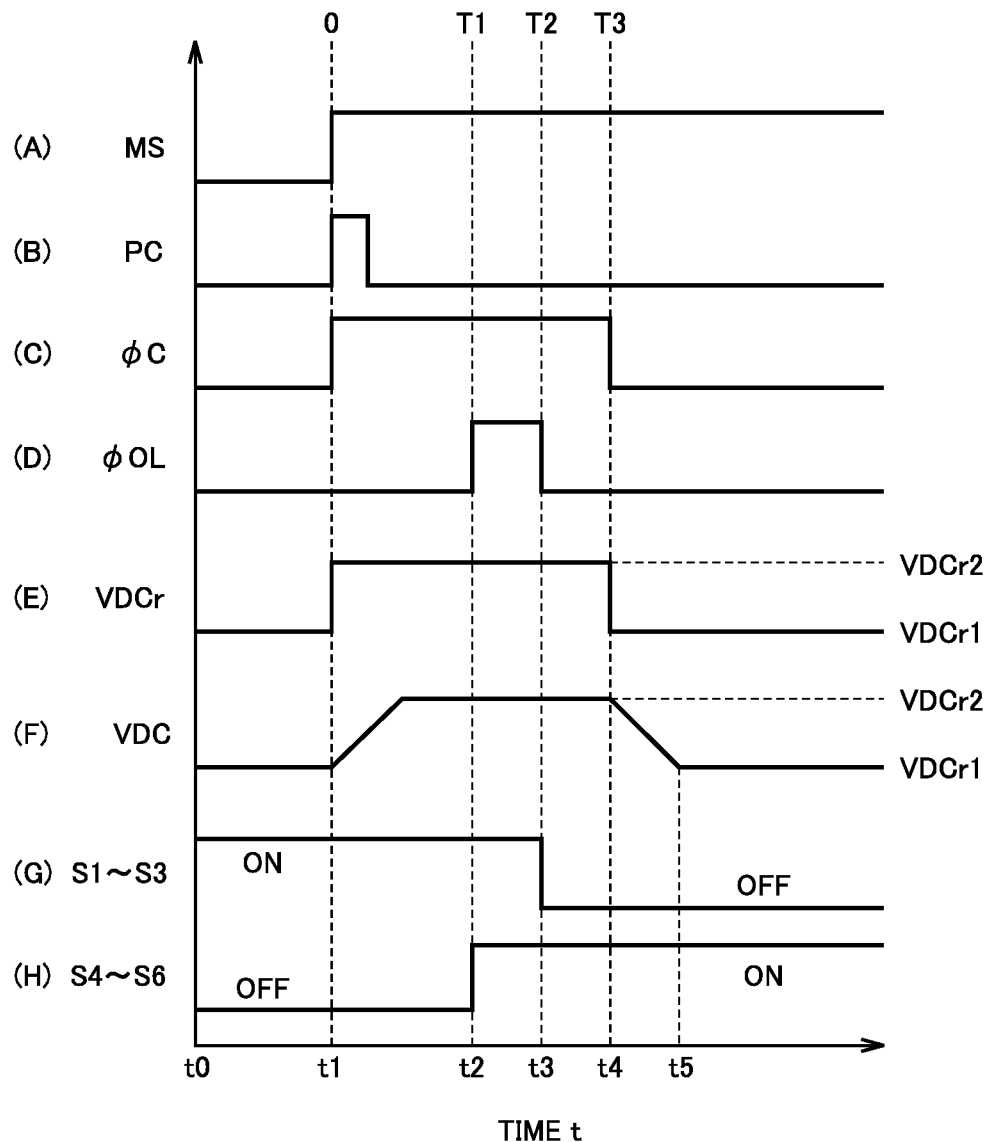
FIG. 10 is a time chart showing the operation of the control device shown in FIG. 8.
Figure 11:
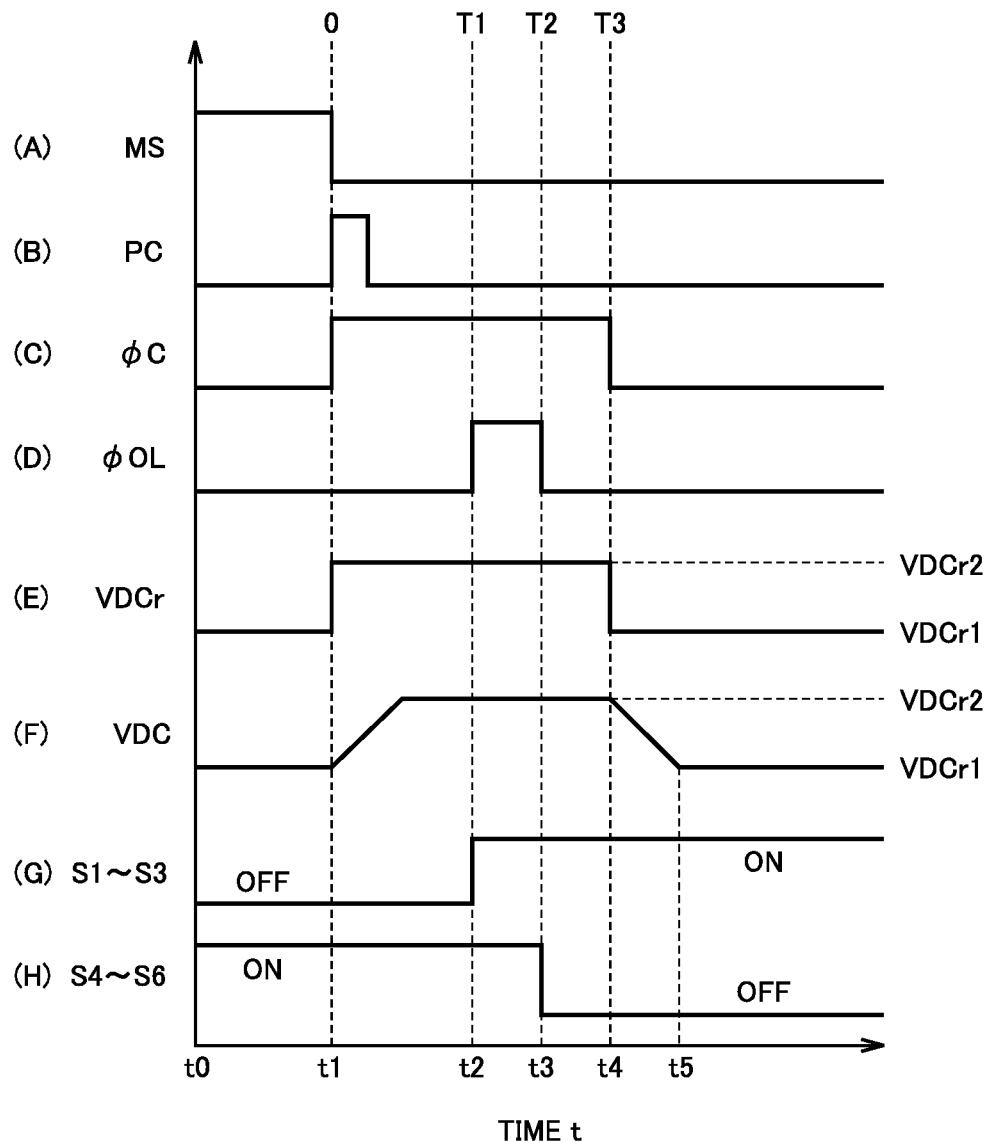
FIG. 11 is another time chart showing the operation of the control device shown in FIG. 8.

FIGS. 10(A) to 10(H) are time charts showing the operation of control device 5 shown in FIG. 8. FIG. 10(A) shows the waveform of mode select signal MS, FIG. 10(B) shows the waveform of switch command signal PC, FIG. 10(C)

shows the waveform of switch signal φC, and FIG. 10(D) shows the waveform of overlap command signal φOL.

FIG. 10(E) shows reference voltage VDCr, FIG. 10(F) shows terminal-to-terminal voltage VDC of capacitor Cd, FIG. 10(G) shows the state of switches S1 to S3, and FIG. 10(H) shows the state of switches S4 to S6. FIGS. 10(A) to 10(H) show the operation in a case where the inverter power feed mode is switched to the bypass power feed mode.

At time t0, the inverter power feed mode is executed, and all of mode select signal MS, switch command signal PC, switch signal φC, and overlap command signal φOL are brought to "L" level. Reference voltage VDCr is brought to reference voltage VDCr1, terminal-to-terminal voltage VDC of capacitor Cd is brought to reference voltage VDCr1, switches S1 to S3 are turned on, and switches S4 to S6 are turned off.

When the bypass power feed mode is selected using operation unit 4 at a certain time t1, mode select signal MS is raised from "L" level to "H" level, and switch command signal PC is raised to "H" level by signal generating circuit 11 for a predetermined period of time. In response to the rising edge of switch command signal PC, timer 12 successively measures first time T1, second time T2, and third time T3 and generates switch signal φC and overlap command signal φOL based on the time measurement result.

Switch signal φC is brought to "H" level from the rising edge of switch command signal PC (time t1) to third time T3 (time t4). Overlap command signal φOL is brought to "H" level from first time T1 (time t2) to second time T2 (time t3).

When switch signal φC is raised from "L" level to "H" level (time t1), reference voltage VDCr is raised from reference voltage VDCr1 to reference voltage VDCr2, and converter 1 is controlled by control unit 15 such that terminal-to-terminal voltage VDC of capacitor Cd becomes reference voltage VDCr2.

In a period in which terminal-to-terminal voltage VDC of capacitor Cd is reference voltage VDCr2, lap command signal φOL is brought to "H" level, and the lap power feed mode is executed. When lap command signal φOL is raised to "H" level (time t2), switches S4 to S6 are turned on. At this point of time, since terminal-to-terminal voltage VDC of capacitor Cd is raised to reference voltage VDCr2, circulating current IC (FIG. 6, FIG. 7) does not flow. When lap command signal φOL is raised to "L" level (time t3), switches S1 to S3 are turned off, and the lap power feed mode ends.

When switch signal φC is lowered to "L" level (time t4), reference voltage VDCr is lowered to reference voltage VDCr1, and capacitor Cd is discharged. When terminal-to-terminal voltage VDC of capacitor Cd becomes reference voltage VDCr1, the switching from the inverter power feed mode to the bypass power feed mode is completed.

FIGS. 11(A) to 11(H) are other time charts showing the operation of control device 5 shown in FIG. 8, in comparison with FIGS. 10(A) to 10(H). FIG. 11(A) to 11(H) show the operation in a case where the bypass power feed mode is switched to the inverter power feed mode.

At time t0, the bypass power feed mode is executed, mode select signal MS is brought to "H" level, and all of switch command signal PC, switch signal φC, and overlap command signal φOL are brought to "L" level. Reference voltage VDCr is brought to reference voltage VDCr1, terminal-to-terminal voltage VDC of capacitor Cd is brought to reference voltage VDCr1, switches S1 to S3 are turned off, and switches S4 to S6 are turned on.

When the inverter power feed mode is selected using operation unit 4 at a certain time t1, mode select signal MS is lowered from "H" level to "L" level, and switch command signal PC is raised to "H" level by signal generating circuit 11 for a predetermined period of time. In response to the rising edge of switch command signal PC, timer 12 successively measures first time T1, second time T2, and third time T3 and generates switch signal φC and overlap command signal φOL based on the time measurement result.

Switch signal φC is brought to "H" level from the rising edge of switch command signal PC (time t1) to third time T3 (time t4). Overlap command signal φOL is set to "H" level from first time T1 (time t2) to second time T2 (time t3).

When switch signal φC is raised from "L" level to "H" level (time t1), reference voltage VDCr is raised from reference voltage VDCr1 to reference voltage VDCr2, and converter 1 is controlled by control unit 15 such that terminal-to-terminal voltage VDC of capacitor Cd becomes reference voltage VDCr2.

In a period in which terminal-to-terminal voltage VDC of capacitor Cd is reference voltage VDCr2, lap command signal φOL is brought to "H" level, and the lap power feed mode is executed. When lap command signal φOL is raised to "H" level (time t2), switches S1 to S3 are turned on. At this point of time, since terminal-to-terminal voltage VDC of capacitor Cd is raised to reference voltage VDCr2, circulating current IC (FIG. 6, FIG. 7) does not flow. When lap command signal φOL is raised to "L" level (time t3), switches S4 to S6 are turned off, and the lap power feed mode ends.

When switch signal φC is lowered to "L" level (time t4), reference voltage VDCr is lowered to reference voltage VDCr1, and capacitor Cd is discharged. When terminal-to-terminal voltage VDC of capacitor Cd becomes reference voltage VDCr1, the switching from the bypass power feed mode to the inverter power feed mode is completed.

As described above, in the present embodiment, in the switching period in which the inverter power feed mode and the bypass power feed mode are switched, converter 1 is controlled such that terminal-to-terminal voltage VDC of capacitor Cd becomes reference voltage VDCr2 higher than reference voltage VDCr1 to prevent circulating current IC from flowing through a path including capacitor Cd. Therefore, even when both of neutral point terminal 6d of commercial AC power supply 6 and neutral point terminal 7d of bypass AC power supply 7 are grounded, flowing of circulating current IC can be prevented.

The embodiments disclosed here should be understood as being illustrative in all respects and should not be construed as being limiting. The present invention is shown not in the foregoing description but in the claims, and it is intended that all modifications that come within the meaning and range of equivalence to the claims are embraced here.

REFERENCE SIGNS LIST

C1 to C6, Cd capacitor, L1 to L6 reactor, CT1 to CT6 current detector, 1 converter, Lp DC positive bus, Ln DC negative bus, 2 bidirectional chopper, 3 inverter, S1 to S6 switch, 4 operation unit, 5 control device, 6 commercial AC power supply, 6d, 7d neutral point terminal, 6U, 6V, 6W, 7U, 7V, 7W AC power supply, 7 bypass AC power supply, 8 load, Q1 to Q6, Q11 to Q16 IGBT, D1 to D6, D11 to D16 diode, 11 signal generating circuit, 12 timer, 13, 15 control unit, 14 reference voltage generating circuit, 21, 28 voltage detector, 22, 26A to 26C subtracter, 23 DC voltage control circuit, 24 sine wave generating circuit, 25A to 25C multiplier, 27 current control circuit, 29A to 29C adder, 30 PWM circuit, 31 gate circuit.

The invention claimed is:

1. An uninterruptible power supply apparatus comprising:
a forward converter that converts three phase AC voltage supplied from a first AC power supply to DC voltage;
a capacitor that smoothes DC output voltage of the forward converter;
a reverse converter that converts terminal-to-terminal voltage of the capacitor to three phase AC voltage;
a first switch disposed corresponding to each phase of three phase AC voltage supplied from the reverse converter, the first switch having one terminal receiving AC voltage of a corresponding phase and the other terminal connected to a load;
a second switch disposed corresponding to each phase of three phase AC voltage supplied from a second AC power supply, the second switch having one terminal receiving AC voltage of a corresponding phase and the other terminal connected to the load;
a first control unit; and
a second control unit, wherein
the first control unit
(i) turns on the first switch and turns off the second switch in a first mode in which three phase AC voltage is supplied from the reverse converter to the load,
(ii) turns on the second switch and turns off the first switch in a second mode in which three phase AC voltage is supplied from the second AC power supply to the load, and
(iii) turns on both of the first and second switches and executes a third mode in which three phase AC voltage is supplied from both of the reverse converter and the second AC power supply to the load, in a switching period in which one mode of the first and second modes is switched to the other mode, and
the second control unit
(iv) controls the forward converter such that terminal-to-terminal voltage of the capacitor becomes a first reference voltage in the first and second modes and
(v) controls the forward converter such that terminal-to-terminal voltage of the capacitor becomes a second reference voltage higher than the first reference voltage in the switching period,
to prevent circulating current from flowing from one AC power supply of the first and second AC power supplies to the other AC power supply through the capacitor.

2. The uninterruptible power supply apparatus according to claim 1, wherein
each of the first and second AC power supplies includes a three-phase AC power supply start-connected to a neutral point,
both of neutral points of the first and second AC power supplies are grounded, and
the first reference voltage is lower than a voltage twice a peak value of three phase AC voltage supplied from the first AC power supply, and
the second reference voltage is equal to or higher than a voltage twice the peak value of three phase AC voltage supplied from the first AC power supply.

3. The uninterruptible power supply apparatus according to claim 2, wherein
the first AC power supply is a commercial AC power supply, and
the second AC power supply is a power generator.

4. The uninterruptible power supply apparatus according to claim 1, further comprising:
a selector that selects one mode of the first and second modes;
a signal generating circuit that outputs a switch command signal in response to a mode selected by the selector being changed from one mode to the other mode; and
a timer that successively measures a first time, a second time, and a third time, in response to the switch command signal, wherein
in the switching period, the first control unit executes the third mode from when the first time is measured by the timer to when the second time is measured by the timer, and
in the switching period, the second control unit controls the forward converter such that terminal-to-terminal voltage of the capacitor becomes the second reference voltage, from when the switch command signal is output to when the third time is measured by the timer.

5. The uninterruptible power supply apparatus according to claim 4, further comprising:
a reference voltage generating circuit that outputs the first reference voltage in the first and second modes and outputs the second reference voltage from when the switch command signal is output to when the third time is measured by the timer; and
a voltage detector that detects terminal-to-terminal voltage of the capacitor,
wherein the second control unit controls the forward converter such that a detected value of the voltage detector becomes an output voltage of the reference voltage generating circuit.

6. The uninterruptible power supply apparatus according to claim 1, further comprising a bidirectional chopper that stores DC power generated by the forward converter into a power storage device in a sound state of the first AC power supply and supplies DC power of the power storage device to the reverse converter at a time of a power failure of the first AC power supply.

* * * * *